United States Patent
Yokoyama

[11] Patent Number: 5,396,378
[45] Date of Patent: Mar. 7, 1995

[54] TIME LAPSE VCR USING ATF ERROR DATA AS A CONTROL SIGNAL

[75] Inventor: Eiichi Yokoyama, Tokyo, Japan

[73] Assignee: Sony Corporation, Tokyo, Japan

[21] Appl. No.: 219,743

[22] Filed: Mar. 29, 1994

Related U.S. Application Data

[63] Continuation of Ser. No. 974,320, Nov. 10, 1992, abandoned, which is a continuation of Ser. No. 629,611, Dec. 18, 1990, abandoned.

[30] Foreign Application Priority Data

Dec. 28, 1989 [JP] Japan .................................. 1-344261

[51] Int. Cl.$^6$ ............................................. G11B 5/584
[52] U.S. Cl. .................................. 360/77.14; 360/35.1
[58] Field of Search ................... 360/10.1, 10.2, 10.3, 360/11.1, 13, 15, 31, 77.12, 77.13, 77.14, 77.15, 73.04, 73.05, 73.07, 73.11, 73.12; 358/312, 323, 337

[56] References Cited

U.S. PATENT DOCUMENTS

| | | | |
|---|---|---|---|
| 4,677,503 | 6/1987 | Nakasawa et al. | 360/77.14 X |
| 4,860,130 | 8/1989 | Yokosawa et al. | 360/77.02 |
| 4,891,644 | 1/1990 | Noro | 360/77.01 X |
| 4,899,233 | 2/1990 | Yoshida | 360/77.14 |
| 5,008,764 | 4/1991 | Yoshida et al. | 360/77.15 |

*Primary Examiner*—Andrew L. Sniezek
*Attorney, Agent, or Firm*—Hill, Steadman & Simpson

[57] ABSTRACT

A video cassette recorder (VCR), using an automatic track finding (ATF) error as a control signal, is comprised of a capstan rotated by a motor, a frequency signal generator also rotated by the motor, and an ATF error measurement circuit for measuring a plurality of ATF errors before switching in an assemble mode.

7 Claims, 9 Drawing Sheets

$f_1 = 102.544$ kHz
$f_2 = 118.951$ kHz  CH-1
$f_3 = 165.210$ kHz  CH-2
$f_4 = 148.689$ kHz

1P A Head Position in Reproducing Mode
(A Center of a Width of The Head Corresponds With a Center of a Width of a Track)

1R A Head Position in Recording Mode
(A Lower Edge of The Head Corresponds With a Lower Edge of a Track)

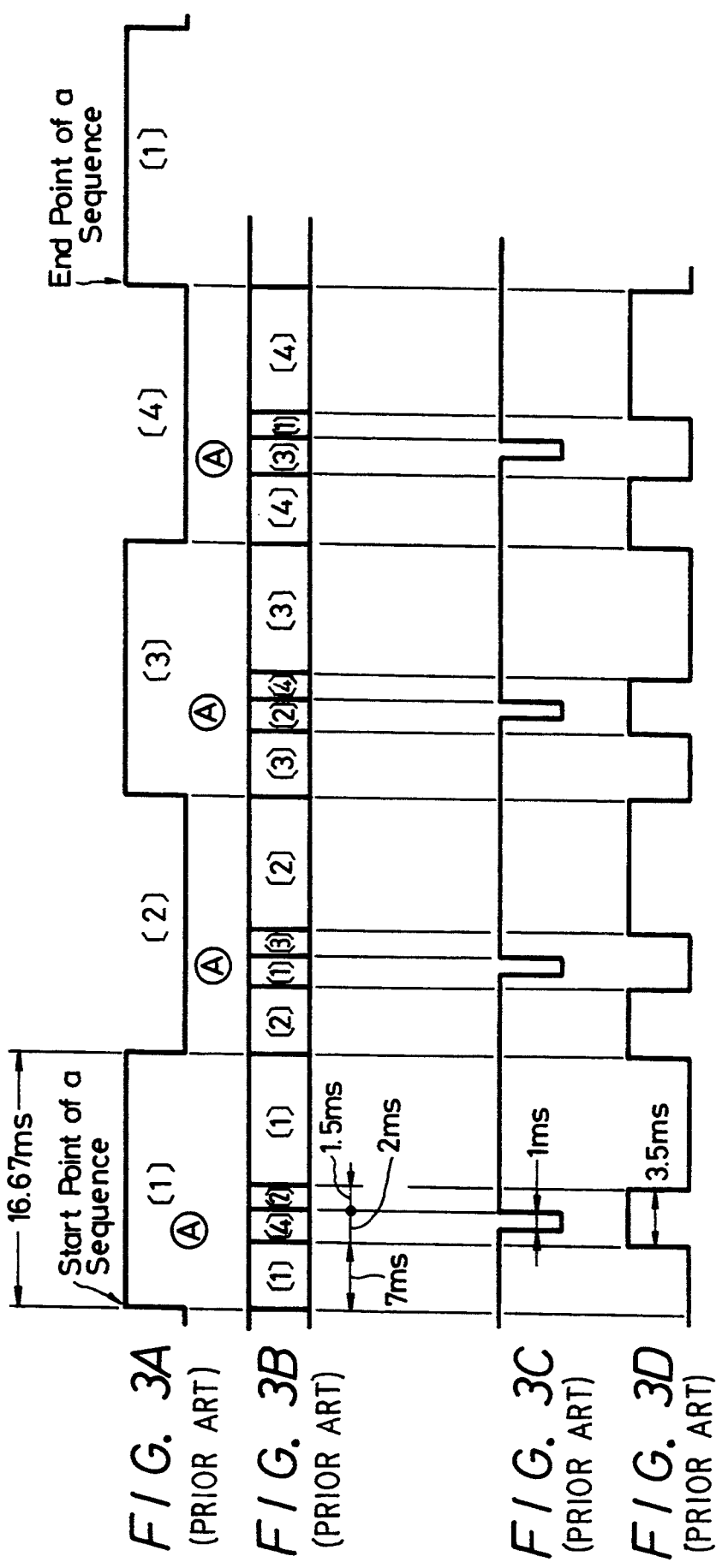

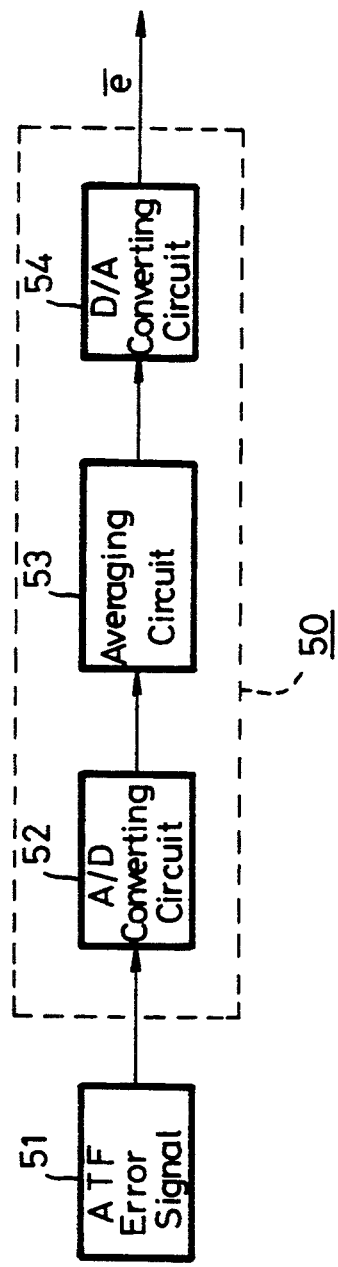
F/G. 6
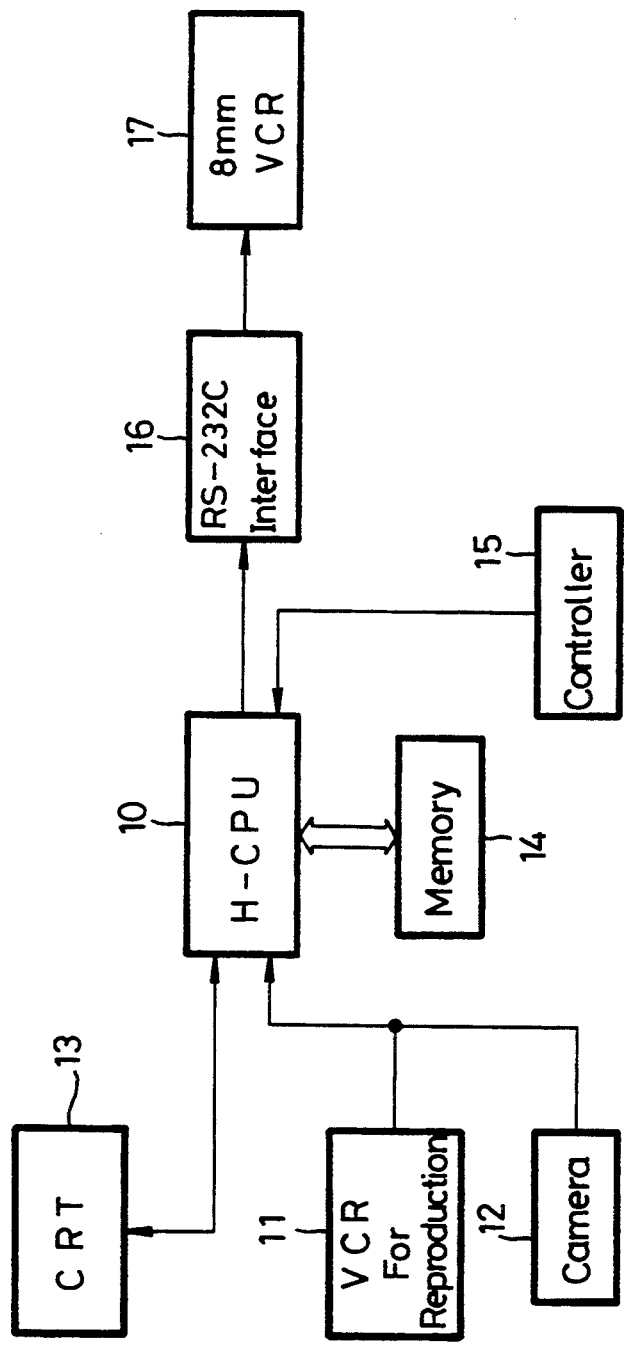
F/G. 7

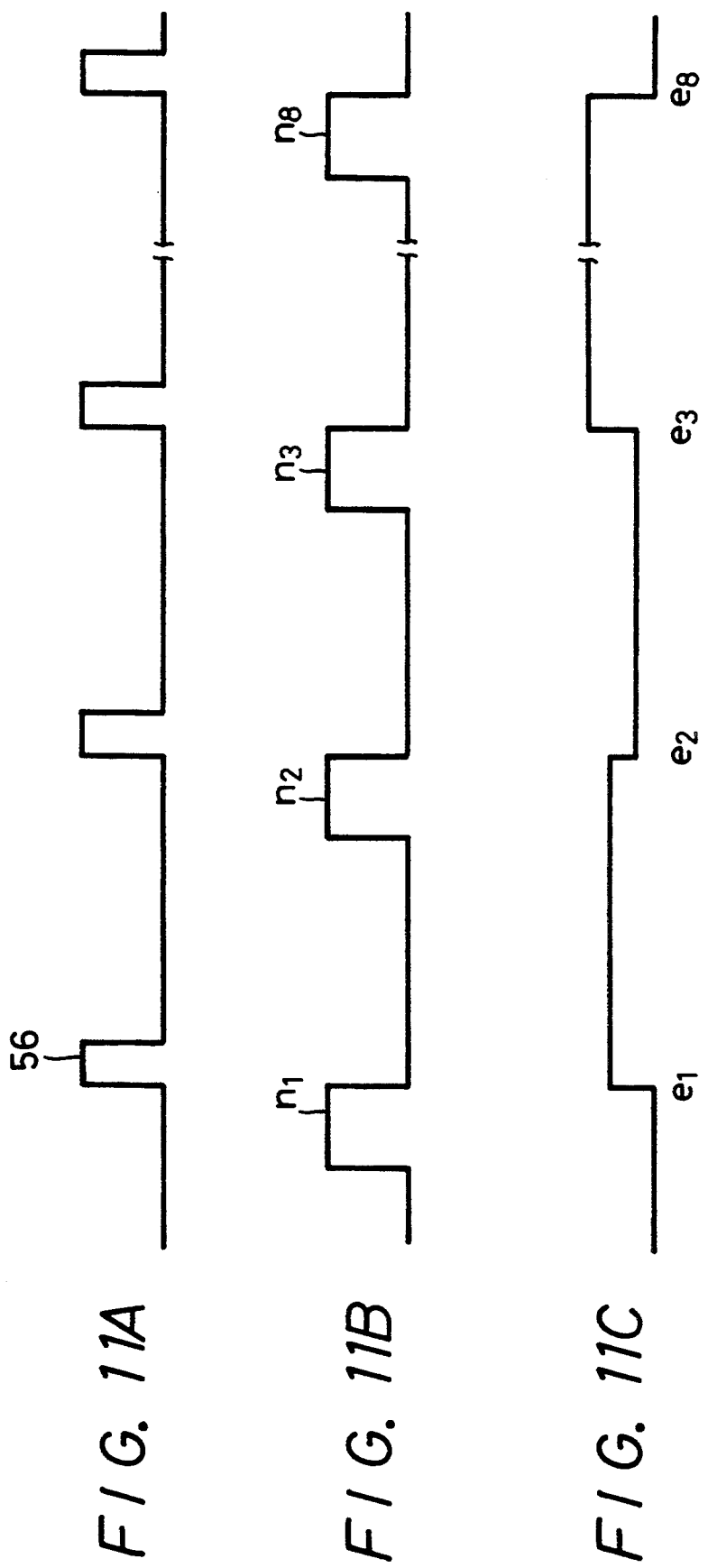

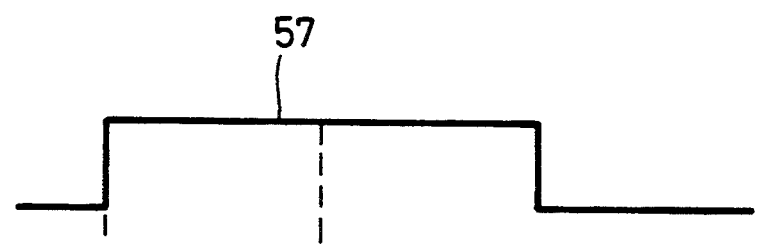
FIG. 12A
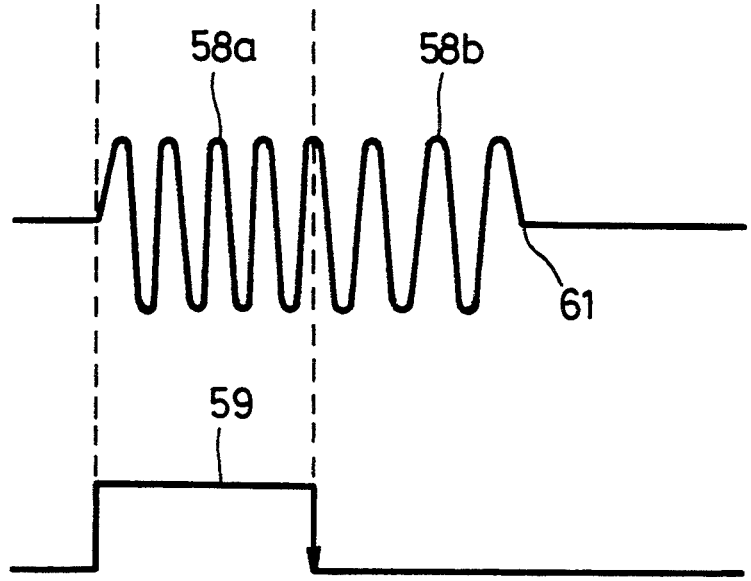
FIG. 12B
FIG. 12C
FIG. 12D

TIME LAPSE VCR USING ATF ERROR DATA AS A CONTROL SIGNAL

This is a continuation of application Ser. No. 07/974,320, filed Nov. 10, 1992, now abandoned, which is a continuation of application Ser. No. 07/629,611, filed Dec. 18, 1990, abandoned.

BACKGROUND OF THE INVENTION

The present invention generally relates to video cassette recorders and, more particularly, to a tracking control apparatus for use in assemble recording, such as a still picture file system, in which a tape is intermittently transported to intermittently record a video signal.

In a so-called 8 mm video cassette recorder, a tracking servo is carried out without using a CTL (control) head. This servo system is what might be called an ATF (automatic track finding) system.

According to the ATF system, tracking pilot signals having four different frequencies $f_1$ to $f_4$ are recorded on the tracks in a superimposed state with a video signal and an audio FM (frequency modulated) signal by a rotary head. The magnetic tape on which the tracking pilot signals are recorded is transported at a predetermined speed and the recorded signal is reproduced by the rotary head. Then the reproduced pilot signal separated from the recorded signal is compared with a reference pilot signal and a rotary phase of a capstan motor is controlled on the basis of a magnitude of a beat component obtained from a compared output.

As shown in FIG. 1, for example, when a magnetic head 1 of channel 2 (CH-2) traces a track in which the tracking pilot signal (TPS) of frequency $f_2$ is recorded, a reproduced signal from a track 3 on the magnetic tape 2 is mixed with tracking pilot signals of frequencies $f_1$ and $f_3$ of the adjacent tracks 4 and 5 in addition to the tracking pilot signal of frequency $f_2$. A reference pilot signal of frequency $f_2$ generated within a reproducing apparatus (not shown) is supplied to a balanced modulator circuit (not shown) which derives beat components of frequencies 16 kHz and 47 kHz. If the rotational speed of the capstan is decreased by some event so as to shift the head to the track in which the tracking pilot signal of frequency $f_2$ is recorded, the beat component of 16 kHz is increased and the beat component of 47 kHz is decreased. Conversely, if the rotational speed of the capstan is increased, the beat component of 16 kHz is decreased and the beat component of 47 kHz is increased. Therefore, if the capstan is servo-controlled such that the beat components of 16 kHz and 47 kHz may become equal to each other, the head of CH-2 correctly traces the track in which the tracking pilot signal of frequency $f_2$ is recorded.

Japanese Patent Laid-Open Gazette No. 59-65962, incorporated herein by reference, describes in detail this type of ATF control apparatus.

In the playback mode utilizing such ATF servo., the center of the head position is made coincident with the center of the track. In that case, if the width of the head is different from the track width after the recording, the optimum position of the head relative to the track is fluctuated in the recording mode and in the reproducing mode. More specifically, during the SP (standard playback) mode, the track width is 20.5 $\mu$m while the width of the head is 25 $\mu$m. As a result, during the recording mode, as shown in FIG. 2, a lower edge of a head 1R must correspond with a lower edge of a track; and during the reproducing mode, a center of a head 1P must correspond with a center of a track. For example, when the recording mode is changed to the recording pause mode and is again changed to the recording mode, in the forward (FWD) running mode (in that case, the ATF servo system is set in the playback mode) after the recording pause mode is released, the lower edge of the head must correspond with the lower edge of the track in the same way as in the recording mode. For this purpose, in the forward running mode, the ATF servo control method is changed to prevent a noise from being produced at the connection point of events. An outline of this operation will be described with reference to a timing chart forming FIGS. 3A–3D.

Reference numerals [1], [2], [3] and [4] of FIGS. 3A–3D represent frequencies of reproduced ATF pilot signals. FIG. 3A shows a timing chart of an RF switching pulse. FIG. 3B shows a timing chart of a reference ATF pilot signal. FIG. 3C shows a timing chart of an ATF sampling pulse. FIG. 3D shows a beat signal of 16 k/$\overline{47}$ kHz. For example, during a period in which the magnetic tape is transported in the forward direction in the recording pause mode, the following operation is carried out in units of 4 fields as shown in FIG. 3A. In the portions shown by Ⓐ in FIG. 3A, only during the period corresponding to the shift amount are the ATF reference pilot signal and the beat signal of frequency 16 k/$\overline{47}$ kHz made the same as those of the ATF error detecting period of the next field (track). For example, when the head reproduces the magnetic tape at its field (track) in which the reproduced frequency is $f_1$, if the frequency of the ATF reference pilot signal is selected to be $f_2$ only during the period whose duration corresponds to the necessary shift amount, a beat component of frequency 16 kHz ($f_2-f_1$) occurs, and the beat signal of frequency 16 k/$\overline{47}$ kHz is at a high (H) level. Thus, the AFT error increases and hence the position of the head relative to the track is advanced and the lower edge of the head corresponds with the lower edge of the track. This shift amount is expressed as:

$$\frac{25 \ \mu m \ - \ 20.5 \ \mu m}{2} : 20.5 \ \mu m = x: (16.67 \ - \ 3)$$

$$x = 1,500$$

As described above, according to the lower edge tracking operation of the 8 mm VCR, the track is shifted slightly from the start of the movement of the tape to the end of movement. The above-described technique cannot be utilized in the time lapse recording, and the lower edge of the head cannot correspond with the lower edge of the track accurately according to this tracking servo operation because of the predictive control operation.

More specifically, the 8 mm VCR utilizes a capstan made of an oil-less metal so that, upon reproduction during which the capstan is normally rotated, an oil film is substantially uniformly formed on the surface of the capstan by a centrifugal force. This forms a lubricant which provides smooth rotation of the capstan. However, when the capstan is revolved intermittently, the effect of the above-described lubricant cannot be expected, which causes a torque ripple to occur in the capstan.

Furthermore, due to the change of the rotational interval of the capstan, a rotational angular error of the capstan is produced even by the same drive voltage. For example, when a capstan motor is once actuated and the next drive voltage is supplied to the capstan motor while extra energy still remains in the capstan motor or when the next drive voltage is applied while the energy of the capstan motor by the former drive voltage is decreased to be zero, the inertia of the capstan becomes different so that the initial condition of the revolution of the capstan is changed. That is, an ATF error is changed with the driving speed of the capstan motor. Therefore, different ATF errors were measured and examples thereof will be described with reference to FIGS. 4A–4C and FIGS. 5A–5C.

Throughout FIGS. 4A–4C and FIGS. 5A–5C, a curve 6 represents a signal which revolves the capstan, and a curve 7 represents an ATF error voltage. FIGS. 4A–4C illustrate the mode in which the capstan is actuated, and FIGS. 5A–5C illustrate the ATF voltages in the auto stop mode.

As is clear from these curves 6 and 7, the ATF error voltages fluctuate considerably. Accordingly, when the revolution of the capstan is controlled on the basis of these ATF error voltages, the ATF error voltages do not always become uniform due to the different kinds of video cassette recorders, and due to the load condition of the capstan.

OBJECTS AND SUMMARY OF THE INVENTION

Accordingly, it is one object of the present invention to provide an improved time lapse video cassette recorder (VCR) which can obviate the aforementioned shortcomings and disadvantages encountered with the prior art.

It is another object of the present invention to provide a time lapse VCR which can improve efficiency in predictive control upon detecting ATF error.

Another object of the present invention is to provide a time lapse VCR which can improve efficiency in the assemble edition mode.

A further object of the present invention is to provide a VCR which is suitably applied to a so-called 8 mm VCR.

According to an aspect of the present invention, a video cassette recorder (VCR) using an automatic track finding (ATF) error as a control signal is comprised of a capstan rotated by a motor, a frequency signal generator also rotated by the motor, and an ATF error measurement circuit for measuring a plurality of ATF errors before switching of the assemble mode.

The above, and other objects, features, and advantages of the present invention, will be apparent in the following detailed description of an illustrative embodiment to be taken in conjunction with the accompanying drawings, in which like reference numerals are used to identify the same or similar parts in the several views.

BRIEF DESCRIPTION OF THE DRAWINGS

FIGS. 3A–3D are waveform diagrams of various signals applied to a video cassette recorder, and to which reference will be made in explaining an ATF servo control method for controlling the lower edge of the track in the forward running mode of a video cassette recorder (VCR) during the change of mode, respectively;

FIG. 6 is a block diagram showing an embodiment of a tracking control apparatus according to the present invention and which is for use with a time lapse VCR using ATF error data as a control signal;

FIG. 7 is a schematic block diagram showing an overall arrangement of a system of this invention which utilizes the time lapse VCR using ATF error data as a control signal;

FIGS. 11A–11C are waveform diagrams showing measured waveforms of ATF errors of the VCR of the present invention, respectively; and FIGS. 12A–12D are waveform diagrams used to explain a step-recording servo operation of the VCR of the present invention, respectively.

DETAILED DESCRIPTION OF THE PREFERRED EMBODIMENT

An embodiment of a time lapse video cassette recorder according to the present invention will hereinafter be described with reference to FIGS. 6 to 12.

Figure 8:
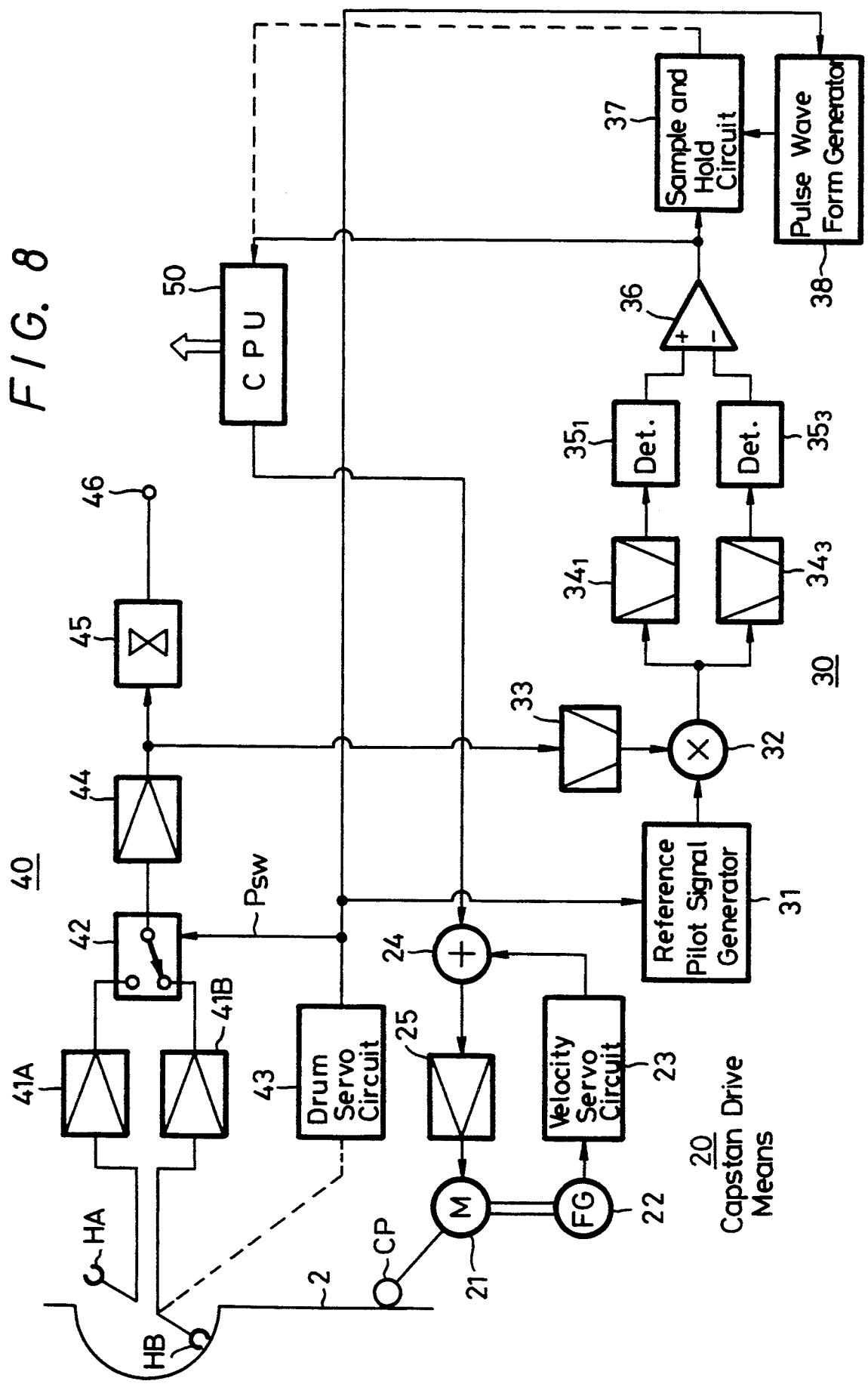
FIG. 8 is a block diagram used to explain a servo system of an 8 mm VCR of the present invention.

Before describing the tracking control apparatus of the present invention with reference to FIG. 6, let us describe an overall arrangement of this embodiment with reference to FIGS. 7 and 8. In this embodiment, the present invention is suitably applied to a system which files a still video image. FIG. 7 shows a systematic block diagram where, for example, a still video image is copied (dubbed) to an 8 mm video tape recorder by way of a host-computer (referred to hereinafter simply as H-CPU) and an interface such as an RS-232C or the like.

In FIG. 7, reference numeral 10 designates an H-CPU, and a still video image is input to the H-CPU 10 from a video cassette recorder 11 for reproduction, an image pickup camera 12, a video file (not shown) or the like. Reference numeral 13 designates a cathode ray tube (CRT) through which a still video image is monitored; 14 is a memory such as a read only memory (ROM), a random access memory (RAM) and so on, and which is included in the H-CPU 10; 15 is a controller; 16 is an interface such as an RS-232C interface or the like; and 17 is an 8 mm video cassette recorder including a subcentral processing unit (CPU).

In accordance with the aforementioned arrangement, the H-CPU 10 generates various commands to cause the 8 mm video cassette recorder 17 to record the still video image in the assemble mode. According to the assemble recording mode, when an original cut from the raw tape of the video cassette recorder for reproduction, for example, is recorded cut-by-cut, the event is sequentially connected cut-by-cut. In this embodiment, a video signal is recorded at every frame. If the 8 mm video cassette recorder 17 is not supplied with a command from the H-CPU 10 side after awaiting the command for more than 7 minutes, the video cassette recorder 17 stores the final frame number, returns a little, and is placed in the standby mode for awaiting the next command in the tape stopped condition.

FIG. 8 shows an overall arrangement of the 8 mm video cassette recorder to which the present invention is applied.

In FIG. 8, reference numeral 20 generally designates a capstan drive system. In the embodiment of FIG. 8, a motor 21 coupled to a capstan CP is directly connected with a frequency generator (FG) 22, and an output of this frequency generator 22 is supplied to a velocity servo circuit 23. A speed (velocity) error signal from the velocity servo circuit 23 is supplied through an adder 24 to a drive amplifier 25 and an output of the drive amplifier 25 is supplied to the motor 21, thereby forming a velocity servo loop.

In FIG. 8, reference numeral 30 generally designates a tracking detecting system of an ATF type. As shown in FIG. 8, an output from a reference pilot signal generator 31 is supplied to a multiplier 32 which is operable as a balanced modulator circuit, and a reproduced pilot signal component contained in a reproduced RF signal obtained in a reproducing system 40 is supplied to the multiplier 32 by way of a bandpass filter 33.

Figure 9:
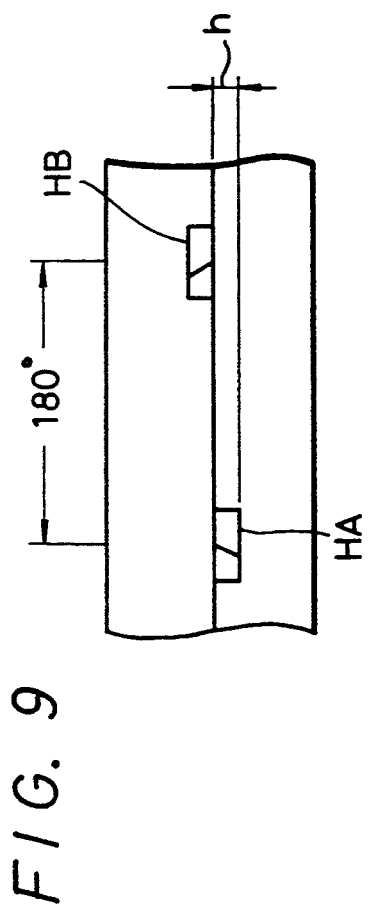
FIG. 9 is a block diagram used to explain rotary heads used in the VCR of the present invention.

As earlier noted, according to the ATF system the pilot signals of predetermined frequencies $f_1$, $f_2$, $f_3$ and $f_4$ are sequentially and cyclically recorded on the respective tracks of the tape 2, while during the reproduction mode the reference pilot signal generator 31 cyclically generates the reference pilot signals of the frequencies $f_1$, $f_4$, $f_3$ and $f_2$ in the sequential order opposite to that of the recording mode. By way of example, these four frequencies $f_1$, $f_2$, $f_3$ and $f_4$ are selected as follows:

$f_1 = 102.54$ kHz $\approx 6.5$ $f_H$
$f_2 = 118.95$ kHz $\approx 7.5$ $f_H$
$f_3 = 165.21$ kHz $\approx 10.5$ $f_H$
$f_4 = 148.69$ kHz $\approx 9.5$ $f_H$ An output of the multiplier 32 is supplied through bandpass filters $34_1$ and $34_3$, whose center frequencies are $f_H$ and $3f_H$, respectively, to detectors $35_1$ and $35_3$, and outputs from the detectors $35_1$ and $35_3$ are supplied to a comparator 36. An output from the comparator 36 is supplied to a sample and hold circuit 37, and a sampling pulse from a pulse wave form generator 38 is supplied to the sample and hold circuit 37. An output from the sample and hold circuit 37 is supplied to the adder 24 in the capstan drive system 20. In the reproducing system 40, outputs from a pair of magnetic heads HA and HB are respectively supplied through preamplifiers 41A and 41B to a change-over switch 42. As shown in FIG. 9, the magnetic heads HA and HB have therebetween a level difference h corresponding to one track pitch on the tape. The magnetic heads HA and HB have different azimuth angles. The change-over switch 42 is supplied with a switching pulse $P_{SW}$ from a drum servo circuit 43, and an output from the change-over switch 42 is supplied through an amplifier 44 to an FM-demodulator 45. A demodulated output from the FM-demodulator 45 is fed to an output terminal 46 as a reproduced signal.

The ATF error recorded according to the aforementioned ATF system is measured by an error measuring command from the H-CPU 10 side. In this embodiment, the ATF error is measured by a circuit 50 shown in FIG. 6.

Figure 4A:
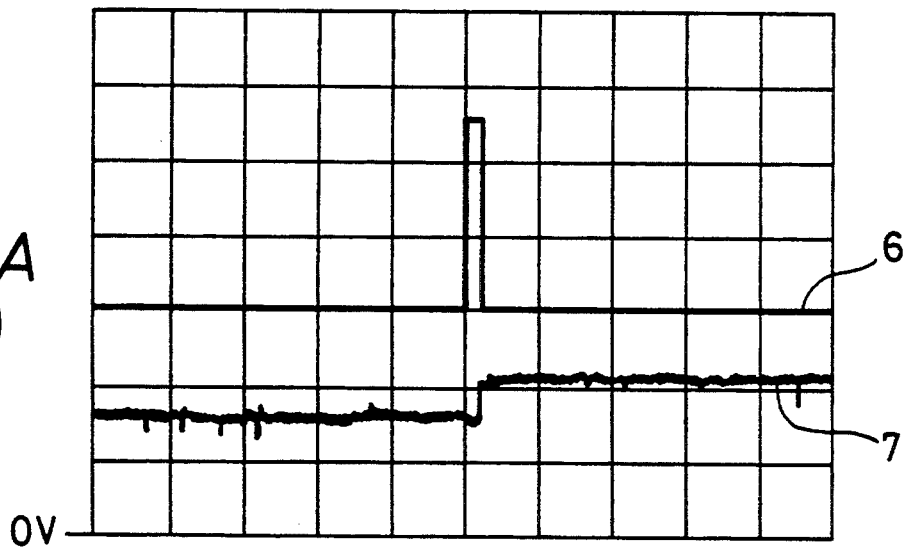
FIGS. 4A–4C and FIGS. 5A–5C are waveform diagrams of ATF errors, respectively.
Figure 4B:
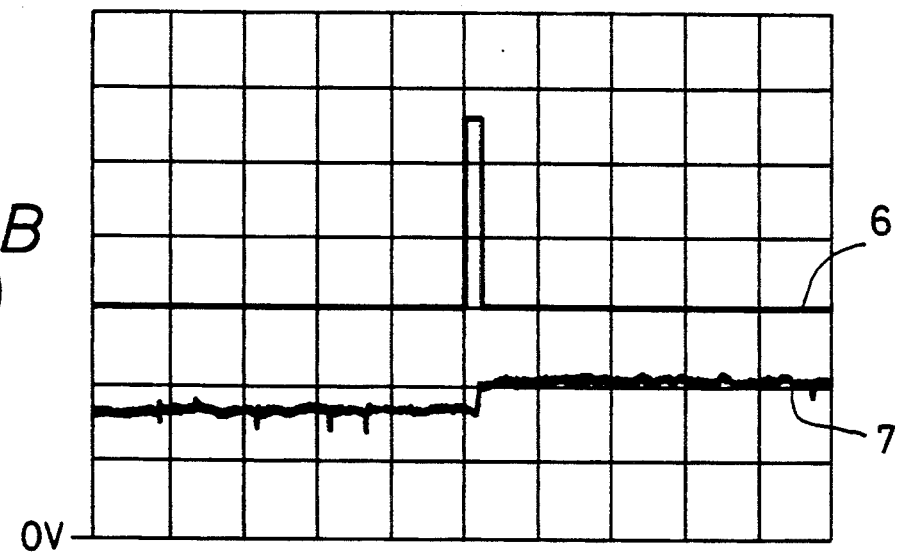
Figure 4C:
Figure 5A:
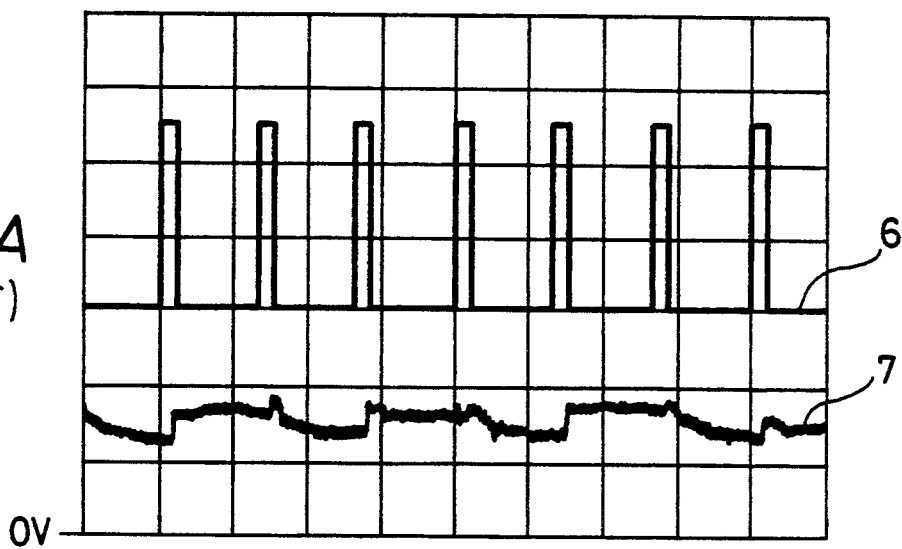
Figure 5B:
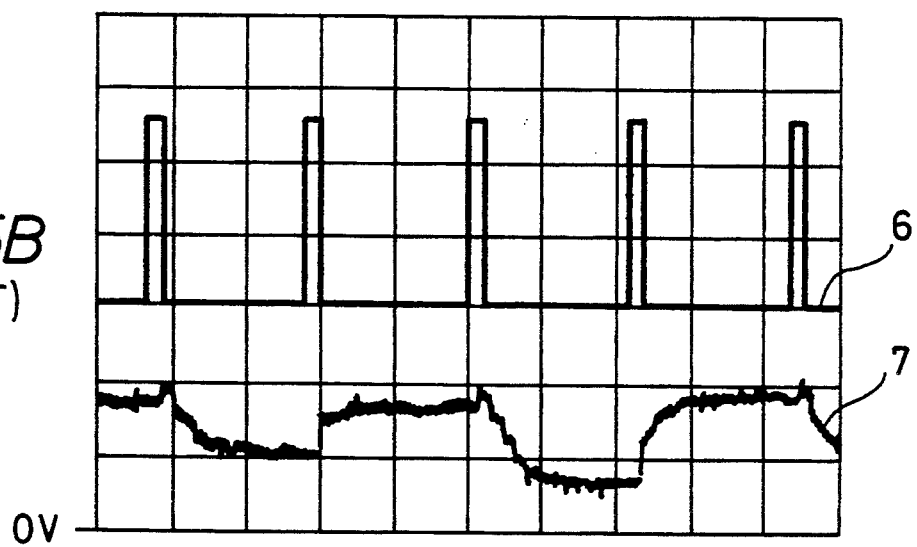
Figure 5C:
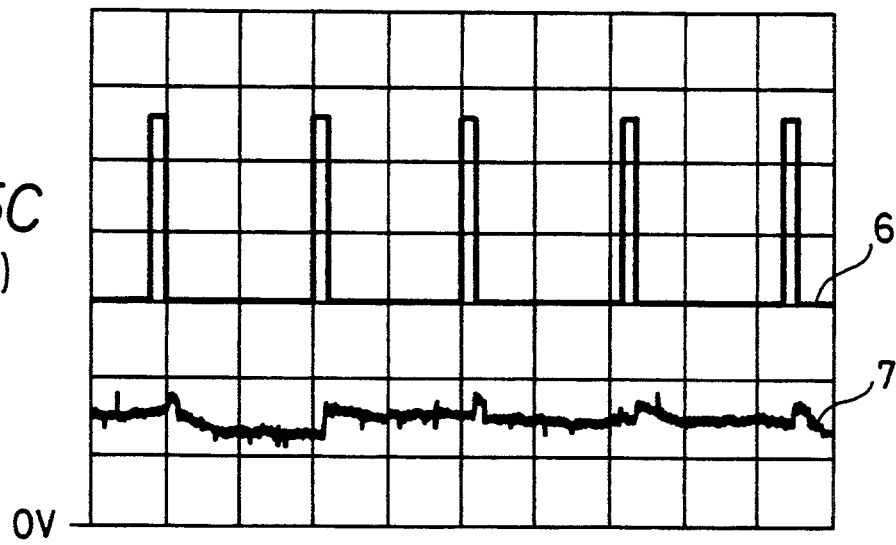

As shown in FIG. 6, an ATF error signal 51 from the sample and hold circuit 37 or the comparator 36 shown in FIG. 8 is supplied to an analog-to-digital (A/D) converting circuit 52, in which the analog ATF error signal shown in FIGS. 4 and 5 is converted into a digital signal. Further, the digitized ATF error signal is averaged by an averaging circuit 53. The thus averaged ATF error signal is supplied to a digital-to-analog (D/A) converting circuit 54, in which it is converted to an analog ATF error signal and is fed to the adder 24 shown in FIG. 8. The A/D converting circuit 52, the averaging circuit 53, and the D/A converting circuit 54 are formed of a microcomputer. An averaged analog ATF error signal $\bar{e}$ is supplied to the adder 24 and controls the motor 21 of the capstan CP.

In this embodiment, as described before with reference to FIG. 7, when the still video image is recorded on the 8 mm VCR at every frame according to the assemble mode, if the 8 mm VCR is supplied with an assemble mode recording command from the H-CPU 10, the 8 mm VCR is set in the recording pause mode before the track to be recorded, for example 8 steps before as follows:

(i) when the 8 mm VCR is supplied with a ready command from the H-CPU 10, the 8 mm VCR is placed in the frame still mode by the automatic 8-step transport. In this frame still mode, the H-CPU 10 reads, for example, a vertical interval frame code (VIFC) of the time code, and judges the number of tracks up to the 8th track $n_8$ one track before the 9th track $n_9$ which is to be recorded according to the assemble mode. Therefore, the 8 mm VCR of the present invention automatically transports the magnetic tape by 8 steps.

(ii) Simultaneously, the 8 mm VCR is supplied with a measuring start command 55 (see FIG. 10), which is used to measure the ATF error, from the H-CPU 10. In the measurement of the ATF error, as shown in FIG. 11B, ATF errors $e_1$, $e_2$, $e_3$, ..., $e_8$ immediately after one frame shift of the first frame $n_1$ as shown in FIG. 11C are measured. A pulse 56 of FIG. 11A designates an error sampling pulse, and ATF errors $e_1$–$e_8$ from the first track $n_1$ to the eighth track $n_8$ are read-out by the microcomputer 50 shown in FIG. 8. Thus, the ATF error is measured 8 times.

(iii) The thus measured analog ATF error is digitized by the A/D converting circuit 52 and the averaging circuit 53 performs the digital operation of $(e_1 + e_2 + e_3 \ldots e_8)/8$. The averaged value therefrom is supplied to the D/A converting circuit 54, from which there is derived the thus averaged analog ATF error signal $\bar{e}$. On the basis of the analog ATF error signal $\bar{e}$, an ATF error voltage $\epsilon$ is expressed as:

$$\epsilon = \bar{e} + \frac{\bar{e}}{n}$$

The $\bar{e}/n$ is supplied to the capstan motor 21 as a lower edge correcting amount.

When the analog ATF error signal $\bar{e}$ is obtained as described above, the recording servo is performed at the 9th track $n_9$ because new still video image data is recorded in the assemble mode. In this embodiment, a reproducing tracking servo is carried out under the control of the analog ATF error signal $\bar{e}$. At the next 10th track $n_{10}$, the recording servo, that is, a step recording servo, is carried out. An outline of this step recording servo will be described with reference to FIG. 12.

Figure 1:
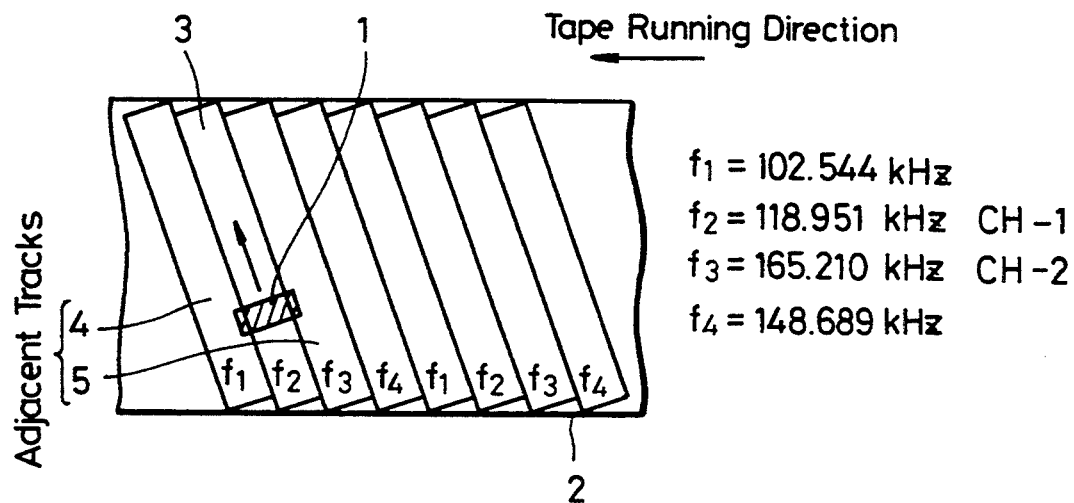
FIG. 1 is a schematic diagram used to explain a conventional automatic track finding (ATF) system.
Figure 2:
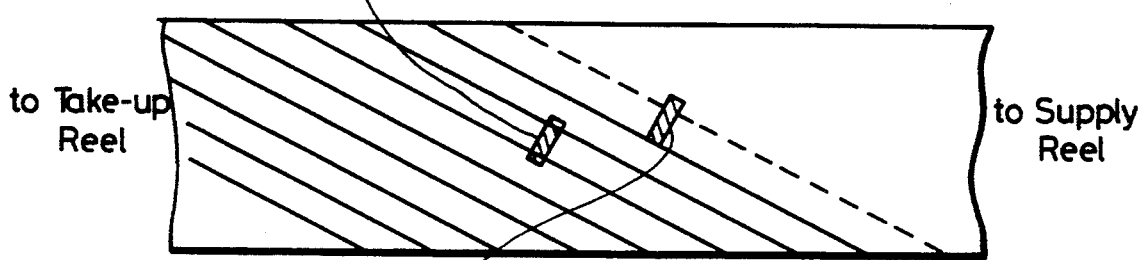
FIG. 2 is a schematic diagram used to explain a tracking pattern where a lower edge of a head corresponds with a lower edge of a track.

In the 8 mm VCR, the track width is 20.25 μm as described with reference to FIG. 2, and the step transport amount, i.e. the step transport shift amount, is expressed as 20.50 μm+20.50 μm=41 μm. Furthermore, while the number of teeth of the frequency generator 22 attached to the motor 21 is, for example, 34, in this step recording servo, when a capstan signal 57 shown in FIG. 12A is supplied from the H-CPU 10 to the CPU 50 of the 8 mm VCR so as to drive the capstan CP, the frequency generator 22 generates an output pulse 58a shown in FIG. 12B. When the output pulse 58a reaches substantially one half of the 34 pulses and a speed (velocity) change signal 59 is generated as shown in FIG. 12C, the rotational velocity of the motor 21 which drives the capstan CP is decreased to about 1/6 of the present velocity, and an output pulse 58b is generated. Under this condition, if a stop signal 60 shown in FIG. 12D is generated, the motor 21 is stopped by the stop signal 60 at a zero cross point 61.

Figure 10:
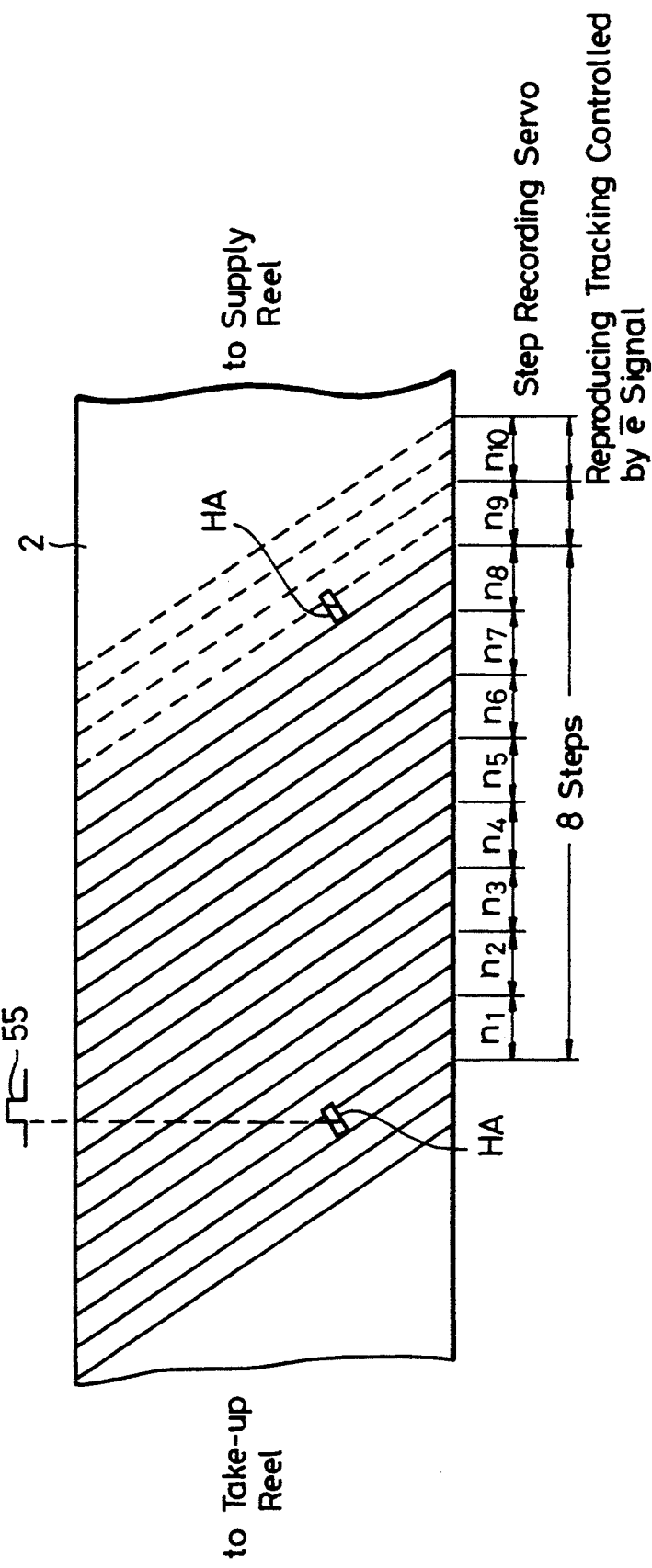
FIG. 10 is a schematic diagram used to explain a step-feed operation of the time lapse VCR which uses ATF error data as a control signal.

According to the thus made arrangement of the present invention as described above, since the behaviors of the mechanisms of the 8 mm VCR are measured at every VCR and the rotational angle of the capstan motor 21 is controlled by the average value of the ATF error signals, as shown in FIG. 10 it is possible to obtain a tracking control apparatus which can accurately perform the tracking of the lower edge in the assemble mode.

Having described a preferred embodiment of the invention with reference to the accompanying drawings, it is to be understood that the invention is not limited to that precise embodiment of the invention, and that various changes and modifications thereof could be effected by one skilled in the art without departing from the spirit or scope of the novel concepts of the invention as defined in the appended claims.

I claim as my invention:

1. A tracking system for use in a video cassette recorder (VCR) which has an assemble mode for recording of still video images, comprising:
    a capstan rotated by a motor, said capstan driving a tape containing slant tracks with pilot signals recorded thereon;
    a servo loop means for controlling a speed of said motor and containing a frequency signal generator rotated by said motor;
    tape head means for reading said pilot signals from said tape and means for reproducing pilot signal components from the pilot signals, said tape head means having a lower edge;
    an ATF (automatic track finding) error measurement means for creating a plurality of n ATF error signals based on signals from a reference pilot signal generator and said reproduced pilot signal components for n tracks before switching to begin recording in the assemble mode, said ATF measurement means providing an assemble mode error signal to said servo loop derived from said plurality of n ATF error signals as a correcting signal for said lower edge of said head means; and
    means for carrying out recording tracking servo under control of said assemble mode error signal at first and second tracks after the n tracks corresponding to said n ATF error signals for recording still video image data in the assemble mode.

2. A system according to claim 1 wherein said ATF error measurement means has an averaging circuit means for averaging said plurality of ATF error signals to create said assemble mode error signal.

3. A system according to claim 2 wherein said averaging circuit means comprises an analog-to-digital converter, a digital averaging circuit connected to said analog-to-digital converter, and a digital-to-analog converter connected to said digital averaging circuit.

4. A system according to claim 1 wherein said ATF error measurement means includes a drum servo circuit; said reference pilot signal generator comprises means for generating a reference signal by using an output signal of said drum servo circuit; a multiplier means for modulating said reference signal and for producing an ATF signal; a plurality of filter means connected to said multiplier means for selecting a frequency component of said ATF signal; a detector means connected to each of said filter means for detecting each of said ATF signal frequency components; and a comparator means connected to said detector means for comparing said detected ATF signal frequency components and producing said ATF error signals.

5. A system according to claim 1 wherein the ATF error measurement means measures a plurality of ATF error signals of a plurality of tracks preceding a track to be recorded in the assemble mode in generating said assemble mode error signal input to said servo loop.

6. A system according to claim 5 wherein eight tracks prior to the track to be recorded generate said plurality of ATF error signals.

7. A system according to claim 1 wherein said ATF error measurement means measures said plurality of ATF error signals upon receiving a measuring start command from a host computer.

* * * * *